(12) United States Patent
Putraya et al.

(10) Patent No.: US 9,342,866 B2
(45) Date of Patent: May 17, 2016

(54) METHOD, APPARATUS AND COMPUTER PROGRAM PRODUCT FOR GENERATING PANORAMA IMAGES

(75) Inventors: Gururaj Putraya, Bangalore (IN); Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/494,230

(22) Filed: Jun. 12, 2012

(65) Prior Publication Data

US 2013/0004100 A1 Jan. 3, 2013

(30) Foreign Application Priority Data

Jun. 30, 2011 (IN) .......................... 2221/CHE/2011

(51) Int. Cl.
*G06K 9/36* (2006.01)
*G06T 3/40* (2006.01)
*H04N 5/232* (2006.01)

(52) U.S. Cl.
CPC .......... *G06T 3/4038* (2013.01); *H04N 5/23238* (2013.01); *G06T 2200/32* (2013.01); *G06T 2207/20221* (2013.01)

(58) Field of Classification Search
CPC .............. H04N 1/387; H04N 5/23238; H04N 2013/0088; G06T 3/4038; G06T 2200/32; G06T 2207/20221
USPC ............ 382/284; 345/634, 635; 348/584, 588
See application file for complete search history.

(56) References Cited

U.S. PATENT DOCUMENTS

| | | | |
|---|---|---|---|
| 6,184,781 B1 * | 2/2001 | Ramakesavan | 340/435 |
| 6,930,703 B1 | 8/2005 | Hubel et al. | |
| 8,750,645 B2 * | 6/2014 | Joshi | G06T 3/4038 382/284 |
| 2003/0103683 A1 | 6/2003 | Horie | |
| 2004/0189849 A1 * | 9/2004 | Hofer | 348/333.03 |
| 2005/0036044 A1 * | 2/2005 | Funakura | 348/239 |
| 2005/0063608 A1 | 3/2005 | Clarke et al. | |
| 2006/0182437 A1 * | 8/2006 | Williams et al. | 396/429 |
| 2006/0188175 A1 * | 8/2006 | Takiguchi et al. | 382/284 |
| 2007/0110305 A1 * | 5/2007 | Corcoran et al. | 382/167 |
| 2007/0182823 A1 * | 8/2007 | Maruyama et al. | 348/207.99 |
| 2007/0230742 A1 * | 10/2007 | Burns et al. | 382/103 |
| 2007/0237420 A1 * | 10/2007 | Steedly et al. | 382/284 |
| 2007/0286526 A1 * | 12/2007 | Abousleman et al. | 382/284 |
| 2009/0201424 A1 * | 8/2009 | Ueda | 348/565 |
| 2010/0034483 A1 * | 2/2010 | Giuffrida et al. | 382/284 |
| 2010/0054628 A1 * | 3/2010 | Levy et al. | 382/284 |

(Continued)

FOREIGN PATENT DOCUMENTS

| | | |
|---|---|---|
| EP | 0837428 A2 | 4/1998 |
| EP | 2017783 A2 | 1/2009 |
| WO | 2008/010762 A1 | 1/2008 |

OTHER PUBLICATIONS

International Search Report and Written Opinion received for corresponding Patent Cooperation Treaty Application No. PCT/FI2012/050516, dated Jan. 8, 2013, 15 pages.

(Continued)

*Primary Examiner* — Yubin Hung
(74) *Attorney, Agent, or Firm* — Harrington & Smith

(57) ABSTRACT

In accordance with an example embodiment a method and apparatus is provided. The method comprises facilitating receiving of a first image and a second image. The method also comprises facilitating receiving of location information of a movable object and generating a panorama image based on the first image, the second image and the location information of the movable object.

22 Claims, 7 Drawing Sheets

(56) References Cited

U.S. PATENT DOCUMENTS

| | | | |
|---|---|---|---|
| 2010/0141772 A1* | 6/2010 | Inaguma et al. | 348/169 |
| 2010/0171810 A1 | 7/2010 | Ohki | |
| 2010/0259647 A1* | 10/2010 | Gann | 348/239 |
| 2011/0085027 A1 | 4/2011 | Yamashita | |
| 2011/0096143 A1 | 4/2011 | Ono | |
| 2011/0149016 A1 | 6/2011 | Kimura | |
| 2012/0092446 A1* | 4/2012 | Peleg et al. | 348/25 |
| 2012/0243802 A1* | 9/2012 | Fintel | H04N 5/2625 382/284 |
| 2012/0294549 A1* | 11/2012 | Doepke | 382/294 |
| 2012/0306850 A1* | 12/2012 | Balan et al. | 345/419 |

OTHER PUBLICATIONS

Xiong et al., "Fast Panorama Stitching for High-quality Panoramic Images on Mobile Phones", IEEE Transactions on Consumer Electronics, vol. 56, Issue 2, May 2010, 9 pages.

"Mosaics of video sequences with moving objects", Chiou-Ting Hsu, et al., Signal Processing Image Communication 19, 2003, pp. 81-98.

"Image stitching with dynamic elements", Alec Mills et al., Image and Vision Computing 27, 2009, pp. 1593-1602.

"Mosaics of Scenes with Moving Objects", James Davis, IEEE, 1998, pp. 354-360.

* cited by examiner

METHOD, APPARATUS AND COMPUTER PROGRAM PRODUCT FOR GENERATING PANORAMA IMAGES

TECHNICAL FIELD

Various implementations relate generally to method, apparatus, and computer program product for generation of panorama images.

BACKGROUND

Panorama image refers to an image captured with an extended field of view in one or more directions (for example, horizontally and/or vertically). The extended field of view is a wide-angle representation beyond that captured by an image sensor. For example, an image that presents a field of view approaching or greater than that of the human eye can be termed as a panorama image. Various devices like mobile phones and personal digital assistants (PDA) are now being increasingly configured with panorama image/video capture tools, such as a camera, thereby facilitating easy capture of the panorama images/videos. Typically, a panorama image may be constructed by capturing a sequence of images such that a pair of adjacent images may have portions that are common between them. For example, the edge portions may be common between the pair of the adjacent images. While forming the panorama image of the captured images, such common portions (hereinafter referred to as overlapping regions) are processed and blended so that a smooth panorama image may be obtained.

SUMMARY OF SOME EMBODIMENTS

Various aspects of examples embodiments are set out in the claims.

In a first aspect, there is provided a method comprising: facilitating at least in part receiving of a first image and a second image; facilitating receiving of location information of a movable object; and generating a panorama image based at least on the first image, the second image and the location information.

In a second aspect, there is provided a method comprising: identifying a presence of a movable object in a viewfinder of a first image; capturing the first image; determining location information of the movable object in the first image; capturing a second image, the second image having an overlapping region with the first image; determining location information of the movable object in the overlapping region of the second image; and generating a panorama image based at least on the first image, the second image and the location information of the movable object in the first image and in the overlapping region in the second image.

In a third aspect, there is provided an apparatus method comprising: at least one processor; and at least one memory comprising computer program code, the at least one memory and the computer program code configured to, with the at least one processor, cause the apparatus at least to perform: facilitating at least in part receiving of a first image and a second image; facilitating receiving of location information of a movable object; and generating a panorama image based on the first image, the second image and the location information of the movable object in the overlapping regions of the first image and the second image.

In a fourth aspect, there is provided a computer program product comprising at least one computer-readable storage medium, the computer-readable storage medium comprising a set of instructions, which, when executed by one or more processors, cause an apparatus to at least perform: facilitating at least in part receiving of a first image and a second image; facilitating receiving of location information of a movable object; and generating a panorama image based on the first image, the second image and the location information.

In a fifth aspect, there is provided an apparatus comprising: means for facilitating at least in part receiving of a first image and a second image; means for facilitating receiving of location information of a movable object; and means for generating a panorama image based on the first image, the second image and the location information.

In a sixth aspect, there is provided a computer program comprising program instructions which when executed by an apparatus, cause the apparatus to: facilitate at least in part receiving of a first image and a second image; facilitate receiving of location information of a movable object; and generate a panorama image based on the first image, the second image and the location information.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
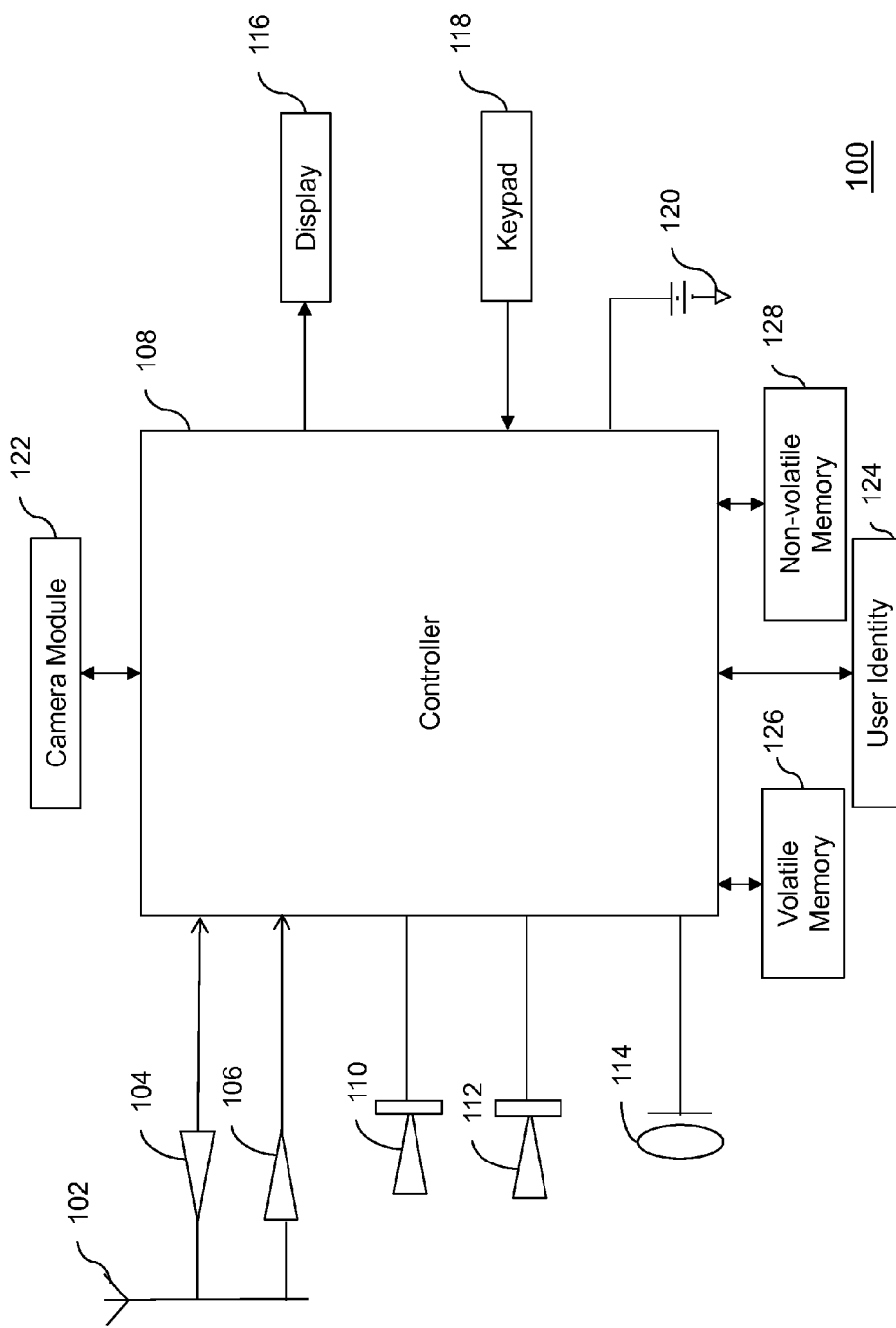
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
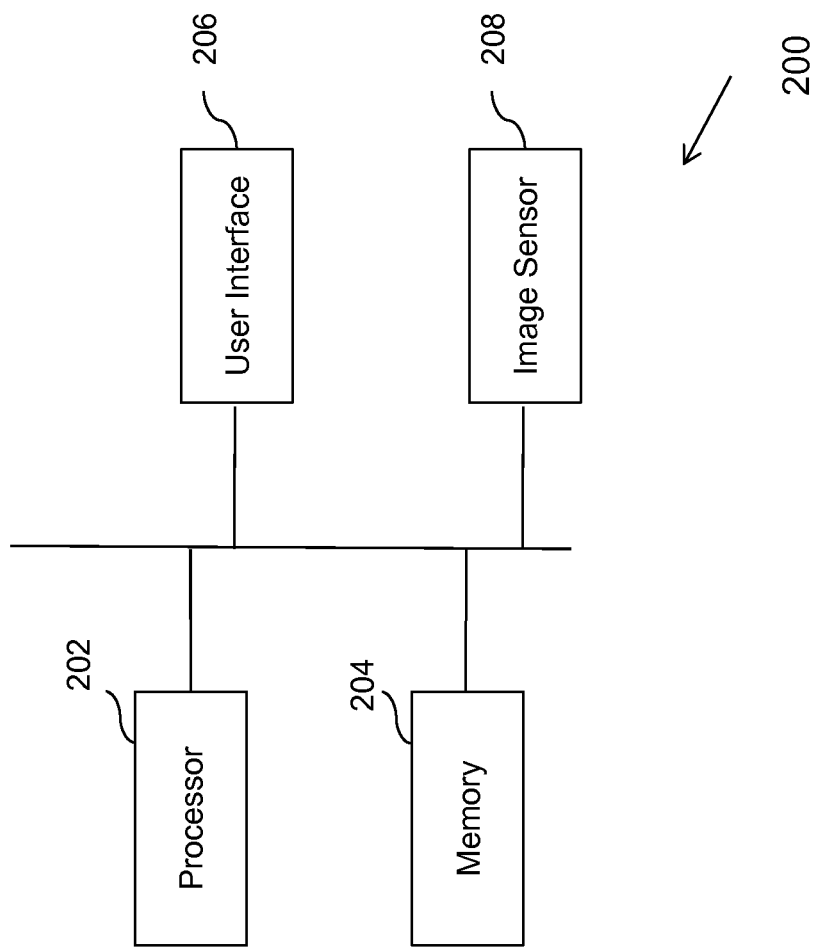
FIG. 2 illustrates an apparatus for generating panorama images in accordance with an example embodiment.

FIG. 2 illustrates an apparatus 200 for generating panorama images in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. In an example embodiment, the apparatus 200 is a mobile phone, which may be an example of a communication device. Alternatively or additionally, embodiments may be employed on a combination of devices including, for example, those listed above. Accordingly, various embodiments may be embodied wholly at a single device, for example, the device 100 or in a combination of devices. It should be noted that some devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the communication device may include a user interface, for example, the UI 206, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device.

The display and display circuitry may be configured to facilitate the user to control at least one function of the communication device.

In an example embodiment, the communication device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the communication device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

In an example embodiment, the processor 202 is configured to, with the content of the memory 204, and optionally with other components described herein, to cause the apparatus 200 to generate panorama images from a sequence of images. The images may be received and/or instantaneously captured by the image sensor 208 and/or other circuitries. Alternatively, the apparatus 200 may receive the sequence of images from internal memory such as hard drive, random access memory (RAM) of the apparatus 200, or from external storage medium such as digital versatile disk (DVD), compact disk (CD), flash drive, memory card, or from external storage locations through the Internet, Bluetooth®, and the like. The apparatus 200 may also receive the images from the memory 204. In an example embodiment, the sequence of images may include subsequently captured images. For example, the sequence of images may include a first image, and a second image where the second image may be a subsequently captured image of the first image. The first image and the second image may refer to any adjacent images in the sequence of images. The first image and the second image may have an overlapping region, and are configured to generate the panorama image of the first image and the second image.

In an example embodiment, the processor 202 is configured to, with the content of the memory 204, and optionally with other components described herein, to cause the apparatus 200 to facilitating at least in part receiving of the first image and the second image. In some example embodiments, the first image and the second image may have an overlapping region and are configured to be blended to generate the panorama image. In an example embodiment, the apparatus 200 is caused to facilitating receipt of the first image and the second image by successively capturing these images by the image sensor 208. Alternatively, the apparatus 200 may facilitate receipt of the first and second images by receiving these images from a memory location internal or external to the apparatus 200, where these images are stored.

In an example embodiment, the processor 202 is configured to, with the content of the memory 204, and optionally with other components described herein, to cause the apparatus 200 to facilitating receiving of location information of a movable object. In some example embodiments, the location information of the movable object comprises location information of the movable object in the overlapping regions of the first image and the second image. However, in some example embodiments, the location information may also correspond to location information of the movable object in non-overlapping regions of at least one of the first image and the second image. In an example embodiment, the location information may comprise information of points associated with the movable object. Herein, the movable object may be any living object or non-living object that is normally moved from one location to another location. Examples of the living object may non-exhaustively include a person, animal, bird, or any other creature. Examples of non-living object may non-exhaustively include objects such as any football in a playground, a vehicle and a kite. In one form, the location information may comprise coordinates of the movable object in an image such as the first image and the second image. In some example embodiments, the location information may correspond to coordinates of any point associated with the movable object. For example, in case of a moving person, the location information may comprise coordinates of the points corresponding to the face, hands, legs, and the like, of the moving person.

In an example embodiment, the apparatus 200 may be caused to identify presence of the movable object in viewfinders of the first image and the second image. In this example embodiment, the apparatus 200 may also be configured to determine points associated with the movable object in the overlapping regions of the first image and the second image.

In an example embodiment, the processor 202 is configured to, with the content of the memory 204, and optionally with other components described herein, to cause the apparatus 200 to generate the panorama image based at least on the first image, second image and the location information of the movable object. In an example embodiment, the apparatus is caused to generate the panorama image based on the first image, the second image and the location information in the overlapping regions of the first image and the second image. The generation of the panorama image is explained in FIGS. 3 to 5.

Figure 3:
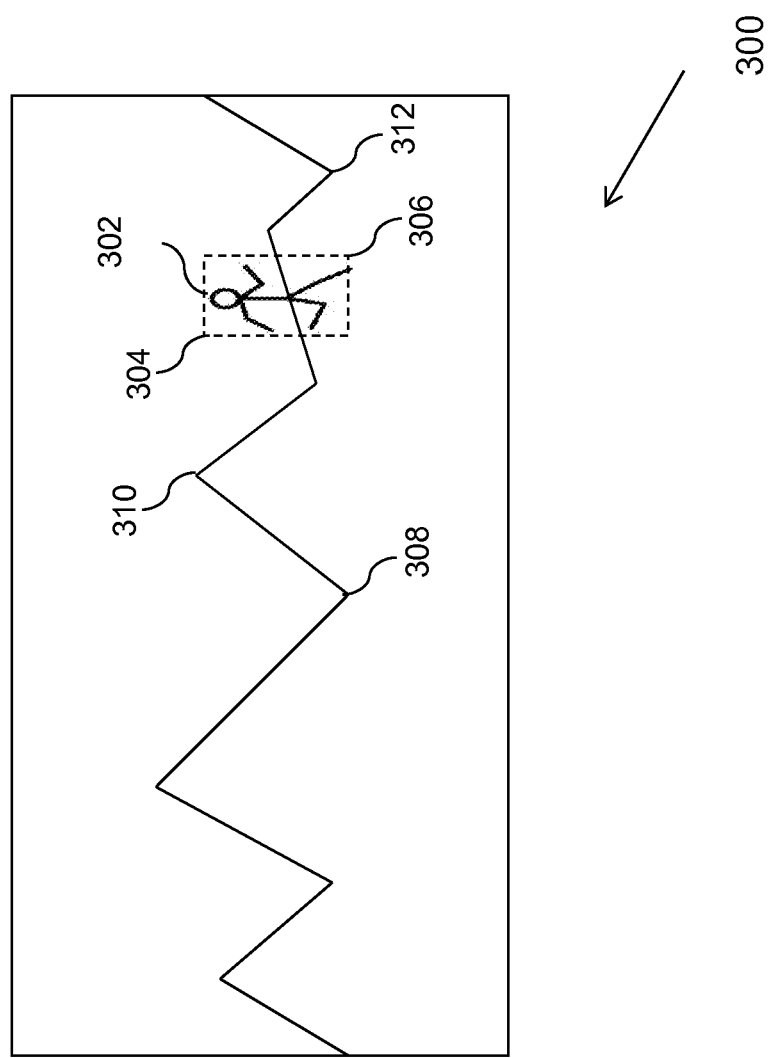
FIG. 3 illustrates an example of a movable object that may be tracked during generation of a panorama image in accordance with an example embodiment.

FIG. 3 illustrates an example of a movable object that may be tracked during generation of a panorama image in accordance with an example embodiment. FIG. 3 represents an example image 300 that includes an object 302. The object 302 may be a movable object, and is shown in a running posture in the image 300 for the example purposes. The apparatus 200 may be caused to identify the object 302 that can move while the image 300 and/or a subsequent image of the image 300 are being captured by the apparatus 200. The apparatus 200 may include and/or have access of an object detection means that may be utilized to identify the movable objects such as the object 302 in a viewfinder of an image such as the image 300, while capturing the image 300. In an example embodiment, the object detection means may be controlled and/or embodied in the processor 202. In an example embodiment, the apparatus 200 may include and/or have access of an object tracking means. In an example embodiment, the object tracking means may be controlled by and/or embodied in the processor 202. In an example embodiment, co-ordinates of the object 302 may be identified as location information of the object 302. In some example embodiments, a rectangular area enclosing the object 302 may be considered for obtaining the co-ordinates of the object 302. For example, in case of any non-living object such as a football, a rectangular area enclosing the football may be selected and its co-ordinates may be determined by the object tracking means. In an example embodiment, the location information may be stored in a memory such as the memory 204, or any external memory accessible to the apparatus 200. In some example embodiments, the location information may be stored as metadata of the image such as the image 300.

In this example of FIG. 3, corner points of the object 302, for example, a top-left coordinate (shown as '304') and a bottom-right co-ordinate (shown as '306') of a rectangular box enclosing the movable object 302 may be saved as location information in the metadata. Some other corner points such as 308, 310 and 312 are also shown in the image 300 that may correspond to other non-movable objects in the image 300. It should be noted that the image 300 is shown only for the example purposes for this description, and only few corner points and a graphical schematic representation of the movable object 302 are shown. The panorama image may be generated by stitching/blending the image 300 with another image subsequently captured/accessed that has the overlapping region with the image 300. As the movable object 302 may change its position in the subsequent image of the image 300, various example embodiments utilize location information of the object 302 in these subsequent images for generation of the panorama image of the image 300 and subsequent images.

Figure 4:
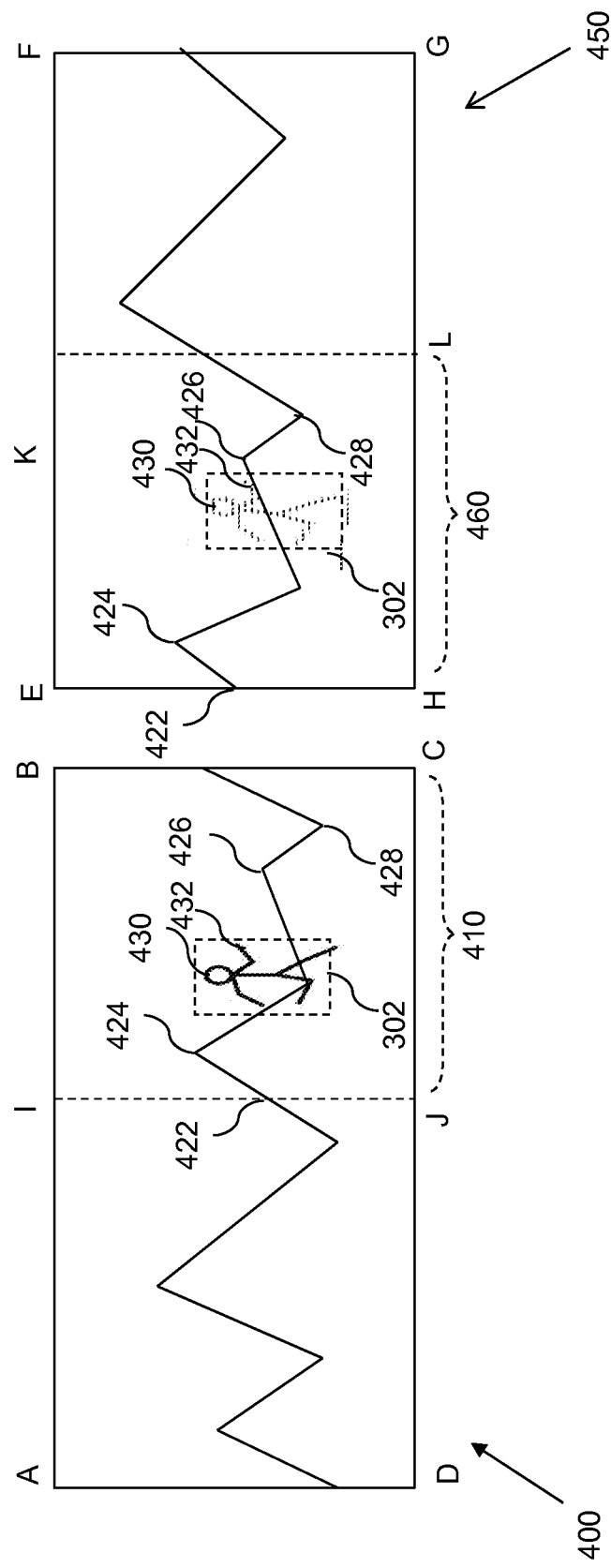
FIG. 4 illustrates an example of a first image and a second image having a movable object and overlapping region for generating the panorama image, in accordance with an example embodiment.

FIG. 4 illustrates an example of a first image and a second image having a movable object and overlapping region for generating a panorama image, in accordance with an example embodiment. FIG. 4 represents a first image 400 and a second image 450. In an example embodiment, the first image 400 (within area enclosed by 'ABCD') and the second image 450 (within area enclosed by 'EFGH') may be successively captured images for generating the panorama image of the first image 400 and the second image 450. In an example embodiment, the second image 450 may be captured, if there is at least a threshold percentage of overlap between viewfinder frame of the last captured image (for example, the first image 400) and a current viewfinder frame (for example, viewfinder of the second image 450). For example, if there is at least 30 percent overlap between the first image 400 and viewfinder of the second image 450, the second image 450 may be captured. In other example embodiments, the first image 400 and the second image 450 having overlap with the first image 400 may be images that are already stored in a memory such as the memory 204, or may be received from an external memory. In the example of FIG. 4, the overlapping regions of the first image 400 and the second image 450 are represented as 410 (area enclosed by 'IBCJ') and 460 (area enclosed by 'EKLH'), respectively.

In an example embodiment, the panorama image may be generated by determining an image registration matrix of the first image 400 and the second image 450. In one form, image registration may be is a step where correspondence of the two adjacent images (for example, the image 400 and 450) are calculated to determine the image registration matrix. Based on this matrix, the images 400 and 450 may be warped, for example, the second image 450 alone or in combination with the first image 400 may be rotated/aligned in a required manifold. In one form, the image registration matrix is determined by finding correspondences between corner points in overlapping regions (410 and 460) of the images 400 and 450. These correspondences are utilized in finding the elements of image registration matrix. In various example embodiments, the corner points corresponding to the movable object are discarded for determining the image registration matrix. In various example embodiments, only correspondences for the points belonging to the non-movable objects in the overlapping regions of the images 400 and 450 are considered for determining the image registration matrix.

In the overlapping region 410, corner points 422, 424, 426, 428, 430 and 432 are shown. In the example of FIG. 4, it may be assumed that the corner points 422, 424, 426 and 428 correspond to non-movable objects, whereas the points 430 and 432 correspond to the movable object 302. Since, the points 422, 424, 426 and 428 correspond to non-moving objects, these points are also shown as present in the overlapping region 260 of the second image 450 without any transformation. Since, the object 302 is moved from one position to the another position, accordingly, the points 430 and 432 corresponding to the object may be transformed in the overlapping region 460 of the second image 450 with respect to the points 422, 424, 426 and 428. In the example of FIG. 4, the points 432 and 434 are discarded in the determination of the image registration matrix. In an example embodiment, the object tracking means may be configured to cause the apparatus 200 to track the points corresponding to the movable object 302, and the apparatus 200 is caused to discard the correspondences of the movable object 302 in the determination the image registration matrix.

Figure 5:
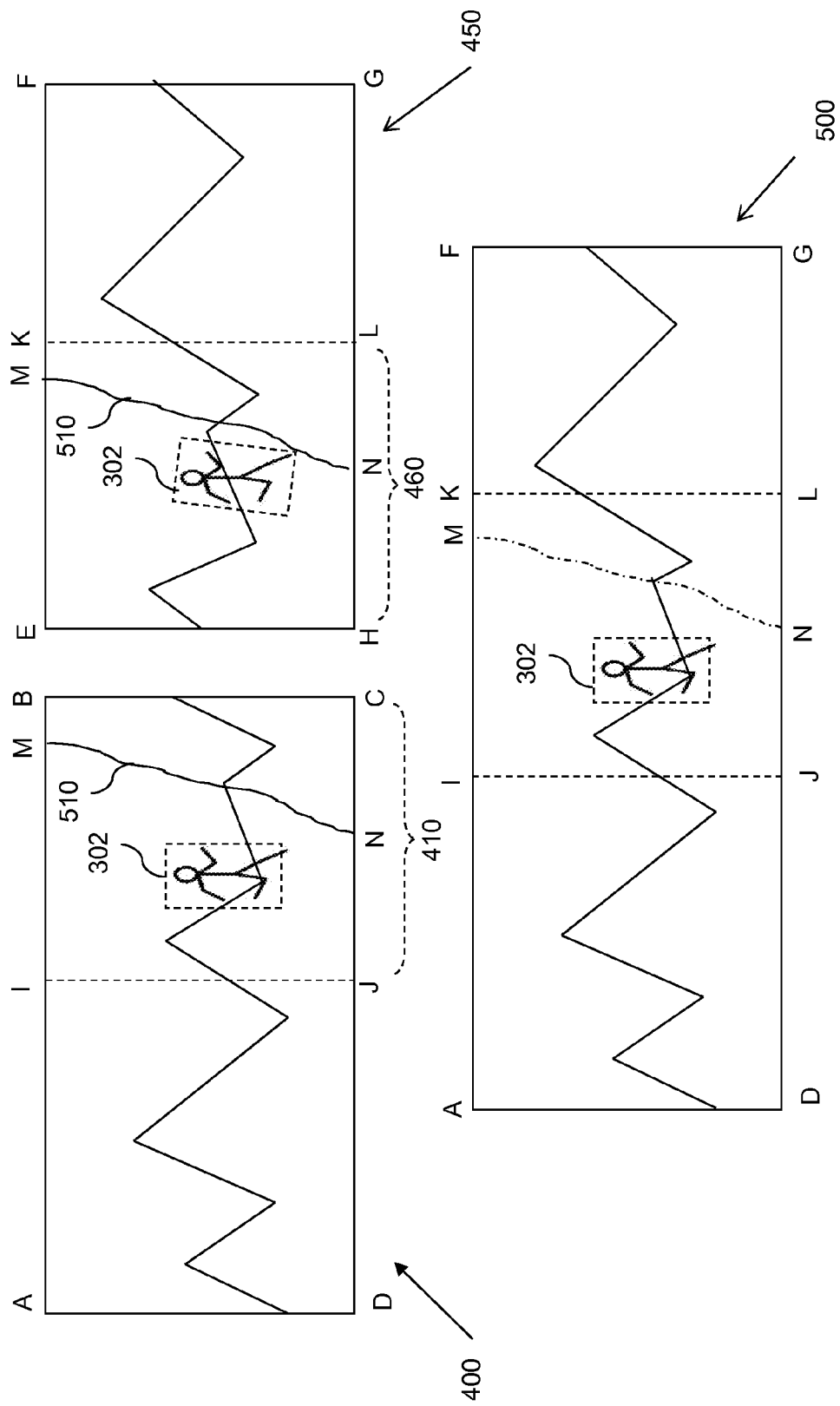
FIG. 5 illustrates an example of generation of the panorama image in accordance with an example embodiment.

In an example embodiment, the generation of the panorama image may optionally include color correction. In some forms, the color correction may be performed of the warped images of the first image 400 and the second image 450. In an example embodiment, the apparatus 200 is caused to label a seam in the overlapping regions of warped images of the at least one of the first image 400 and the second image 450, where the seam is defined such that the seam does not pass through the movable object. For example, the apparatus 200 may be caused to define a seam in the overlapping regions 410 and 460, where the seam does not pass through the movable object 302. Such labeling of the seam is shown in FIG. 5. Herein, the seam represents a curve or line in the overlapping regions of the images such as the images 400 and 450, along which the images 400 and 450 may be blended to generate the panorama image.

FIG. 5 illustrates an example of generation of the panorama image in accordance with an example embodiment. A seam 510 (shown by curve MN) is shown in the overlapping regions 410 and 460 of the first image 400 and the second image 450, respectively. As shown in FIG. 5, the seam 510 does not pass through the movable object 302 in the overlapping regions 410 and 460. In an example embodiment, the seam 510 may be defined in the overlapping regions 410 and 460 at locations that have minimal distortion, and across which the images 400 and 450 may be stitched. In an example embodiment, labeling techniques such as a dynamic programming (DP) based labeling, a graph cut based labeling, and the like may be utilized to define the seam 510.

In an example embodiment, the processing means may be configured to label the seam 510 in the overlapping regions 410 and 460 of the warped images 400 and 450. The processing means is configured to define the seam by utilizing inputs from the object tracking means. For example, the processing means may receive information of the points associated with the movable object 302 from the object tracking means, and this information may be utilized to define the seam 510 such that the seam 510 does not pass through the movable object 302.

In an example embodiment, the first image 400 and the second image 450 maybe blended along the seam 510 to generate a panorama image 500. In one form, the first image 400 and the second image 450 are blended such that the panorama image 500 includes portions of the overlapping regions 410, 460 of the first image 400 and the second image

450. For example, a portion in the left side of the seam 510 in the overlapping region 410 and a portion on the right side of the seam 510 in the overlapping region 460 may be blended to generate the panorama image 500. As shown in the panorama image 500 (shown as area 'AFGD') includes the overlapping portion (shown as area 'IMNJ') of the overlapping region 410 and the overlapping portion (shown as area 'MKLN') of the overlapping region 460. In an example embodiment, a processing means may be configured to blend the first image and the second image 450 to generate the panorama image 500. An example of the processing means may include the processor 202, which may be an example of the controller 108. It should be noted that only two images, for example, the first image 400 and the second image 450 are shown to explain the generation of the panorama image, for the example purposes only; the first image and the second image may represent any two images in a sequence of images meant for the generation of a panorama image of the sequence of images. Various example embodiments may be applicable on generating panorama image for the sequence of images that may include two or more images.

Figure 6:
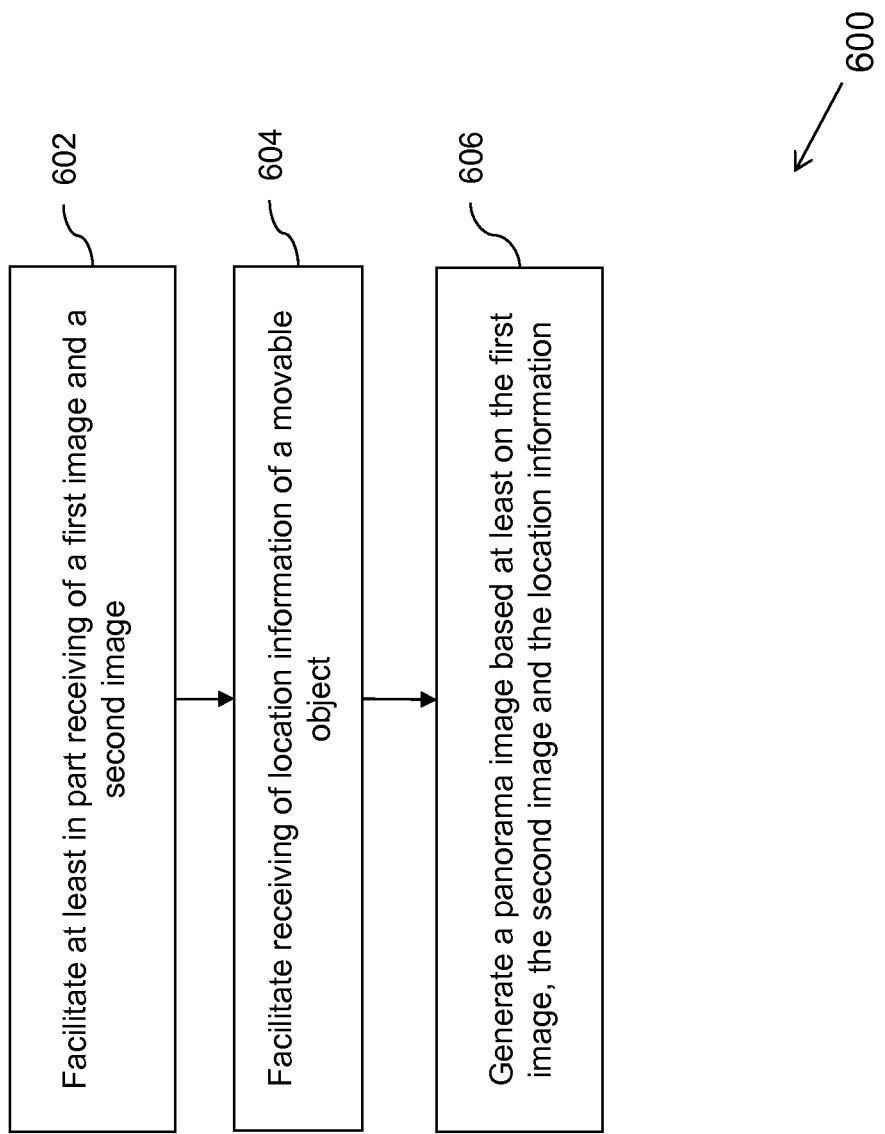
FIG. 6 is a flowchart depicting an example method for generating panorama images in accordance with an example embodiment.

FIG. 6 is a flowchart depicting an example method 600 for generation of a panorama image in accordance with another example embodiment. The method 600 depicted in flow chart may be executed by, for example, the apparatus 200 of FIG. 2. It may be understood that for describing the method 600, references herein may be made to FIGS. 1-5.

At block 602, the method 600 includes facilitating at least in part receiving of a first image and a second image. In an example embodiment, the first image and the second image comprise an overlapping region and are configured to be blended to generate a panorama image. In an example embodiment the first image and the second image may be captured in a successive manner. In some example embodiments, the first and second images may also be received from a memory location, where these images are already stored.

At block 604, the method 600 includes facilitating receiving of location information of a movable object. In an example embodiment, the location information comprises location information of the movable object in the overlapping regions of the first image and the second image. In an example embodiment, the location information may include information of the points associated with the movable object. In an example embodiment, the method 600 may include identifying presence of the movable object in viewfinders of the first image and the second image. In this example embodiment, the apparatus may also be configured to determine points associated with the movable object in the overlapping regions of the first image and the second image. In an example embodiment, the location information may be stored in a memory internal or external to the apparatus. In some example embodiments, the location information may be stored as metadata of the first image and the second image.

At block 606, the method 600 includes generating the panorama image based on the first image, the second image and the location information. In an example embodiment, the panorama image may be generated based on the first image, the second image and the location information of the movable object in the overlapping regions of the first image and the second image. In an example embodiment, generating the panorama image comprises determining an image registration matrix of the first image and the second image. In an example embodiment, the image registration matrix is determined by discarding the points associated with the movable object. In this example embodiment, the first image and the second image may be warped together based on the image registration matrix. In an example embodiment, the method 600 comprises labelling a seam in the overlapping regions of warped images of the at least one of the first image and the second image based on the points associated with the movable object. In this example embodiment, labelling the seam comprises defining the seam such that the seam does not pass through the movable object. The labelling the seam is described in FIG. 5. In an example embodiment, the method 600 includes blending the first image and the second image along the seam to generate the panorama image.

Figure 7:
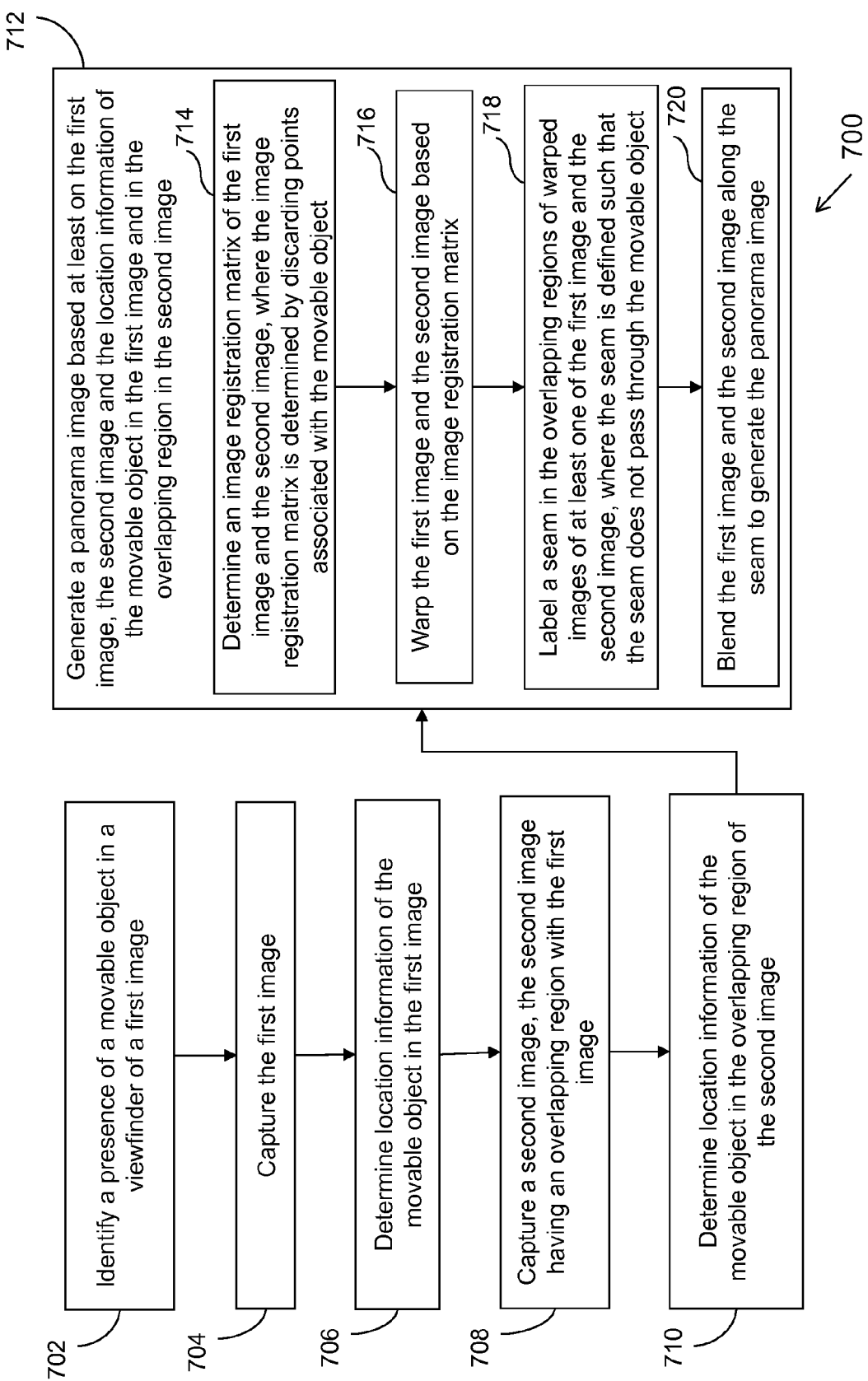
FIG. 7 is a flowchart depicting an example method for generating panorama images in accordance with another example embodiment.

FIG. 7 is a flowchart depicting an example method 700 for generation of a panorama image in accordance with another example embodiment. The method 700 depicted in flow chart may be executed by, for example, the apparatus 200 of FIG. 2. It may be understood that for describing the method 700, references herein may be made to FIGS. 1-5. It should be noted that that although the method 700 of FIG. 7 shows a particular order, the order need not be limited to the order shown, and more or fewer blocks may be executed, without providing substantial change to the scope of the various example embodiments.

At block 702, the method 700 includes identifying presence of a movable object in a viewfinder of a first image. As described in FIG. 3, the apparatus 200 may include and/or have access of an object detection means that may be utilized to identify the movable objects in the viewfinder of the first image. At block 704, the first image such as the first image 400 is captured. At block 706, location information of the movable object is determined in the first image. In an example embodiment, the location information may be stored along with the first image as metadata of the first image. Alternatively, the location information may be stored in a separate file. In an example embodiment, the location information comprises coordinates of the movable object in the first image. As explained in FIGS. 3 and 4, the object tracking means may be configured to determine the location information of the movable object.

At block 708, a second image is captured. The second image has an overlapping region with the first image. In an example embodiment, the second image may be captured if there is at least a threshold percentage of overlap with the first image in a viewfinder frame of the second image. At block 710, the method 700 comprises determining location information of the movable object in the overlapping region of the second image. In an example embodiment, the object tracking means may be configured to track the points corresponding to the movable object in the overlapping region of the second image.

At block 712, the method 700 comprises generating the panorama image based on the first image, the second image and the location information of the movable object in the first image and the overlapping region of the second image. It should be noted that the movable object may or may not be present in both of the overlapping regions of the first image and the second image.

In the example embodiment of FIG. 7, the operation of the block 712 may be performed by a combination of blocks 714, 716 and 718. At block 714, an image registration matrix of the first image and the second image is determined. In an example embodiment, the image registration matrix is determined by discarding the points associated with the movable object. In various example embodiments, correspondences for the points belonging to the non-movable objects in the overlapping regions of the first and second images are considered for determining the image registration matrix.

At block 716, the method 700 includes warping the first image and the second image together based on the image registration matrix. In an example embodiment, the first and second images may be warped based on the image registration matrix; for example, the second image alone or in combination with the first image may be rotated/aligned in a required manifold. At block 718, a seam may be labelled in the overlapping regions of warped images of the at least one of the first image and the second image. In an example embodiment, the seam is defined such that the seam does not pass through the movable object, as described in FIG. 5. At block 720, the method 700 comprises blending the first image and the second image along the seam to generate the panorama image.

Operations of the flowcharts 600 or 700, and combinations of operations in the flowcharts 600 or 700, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowcharts 600 or 700. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods 600 and 700 are described with help of apparatus 200. However, the operations of the methods 600 and 700 can be described and/or practiced by using any other apparatus.

Without in any way limiting the scope, interpretation, or application of the claims appearing below, a technical effect of one or more of the example embodiments disclosed herein is to generate panorama images from a first image and a second image having overlapping region with the first image. Various embodiments track movable objects in the overlapping regions of the first image and the second image. Such embodiments generate image registration matrix of the first image and the second image for generating the panorama image by discarding any correspondences of corner points associated with the movable object. Accordingly, any possible error in the determination of the image registration matrix is avoided by tracking any local movement within the image such as of the movable object, for generating the panorama image. Various embodiments are also capable of labeling a seam in the overlapping regions of the first and second images such that the seam does not pass through the movable object in the overlapping regions. Such labeling of the seam in the overlapping regions avoids possibility of any incorrect blending of the movable object and any resultant visual artifact.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

We claim:

1. A method comprising:
   facilitating at least in part receiving of a first image and a second image;
   facilitating receiving of location information of a movable object, wherein the movable object can change position between the first image and the second image;
   tracking movement of the moveable object, wherein the tracking of the movement of the movable object includes tracking local movement within the image while the images are being captured and as the movable object is moving relative to a separate non-movable object within the image; and
   generating a panorama image based at least on the first image, the second image, the movement, and the location information of the movable object.

2. The method as claimed in claim 1, wherein the location information of the movable object comprises location information in overlapping regions of the first image and the second image.

3. The method as claimed in claim 1, wherein facilitating receipt of the location information comprises:
   identifying presence of the movable object in viewfinders of at least the first image and the second image; and
   determining points associated with the movable object in overlapping regions of the first image and the second image.

4. The method as claimed in claim 3, further comprising storing the location information.

5. The method as claimed in claim 1, wherein generating the panorama image comprises determining an image registration matrix of the first image and the second image, wherein the image registration matrix is determined by discarding points associated with the movable object.

6. The method as claimed in claim 5, further comprising:
warping the first image and the second image based on the image registration matrix;
labelling a seam in the overlapping regions of warped images of the at least one of the first image and the second image based on the points associated with the movable object; and
blending the first image and the second image along the seam to generate the panorama image.

7. The method as claimed in claim 6, wherein labelling the seam comprises defining the seam such that the seam does not pass through the movable object when the movable object is moving relative to a separate non-movable object within the image, and wherein defining the seam is based, at least partially, on information of the points associated with the movable object.

8. The method as claimed in claim 1, wherein the location information of the movable object comprises coordinates of points corresponding to legs of the movable object.

9. An apparatus comprising:
at least one processor; and
at least one memory comprising computer program code, the at least one memory and the computer program code configured to, with the at least one processor, cause the apparatus at least to:
facilitate at least in part receiving of a first image and a second image;
facilitate receiving of location information of a movable object, wherein the movable object can move from a first position to another different position of the images;
track local movement of the moveable object while the images are being captured and as the movable object is moving relative to a separate non-movable object within the image; and
generate a panorama image based at least on the first image, the second image, the movement, and the location information of the movable object.

10. The apparatus as claimed in claim 9, wherein the location information of the movable object comprises location information in overlapping regions of the first image and the second image.

11. The apparatus as claimed in claim 9, wherein, to facilitate receipt of the location information, the apparatus is further caused, at least in part, to:
identify presence of the movable object in viewfinders of the first image and the second image; and
determine points associated with the movable object in overlapping regions of the first image and the second image.

12. The apparatus as claimed in claim 11, wherein the apparatus is further caused, at least in part to, store the location information.

13. The apparatus as claimed in claim 9, wherein, to generate the panorama image, the apparatus is further caused, at least in part to, determine an image registration matrix of the first image and the second image, wherein to determine the image registration points associated with the movable object are discarded.

14. The apparatus as claimed in claim 13, wherein the apparatus is further caused, at least in part to:
warp the first image and the second image based on the image registration matrix;
label a seam in the overlapping regions of warped images of the at least one of the first image and the second image based on the points associated with the movable object; and
blend the first image and the second image along the seam to generate the panorama image.

15. The apparatus as claimed in claim 14, wherein, to label the seam, the apparatus is further caused, at least in part to, define the seam such that the seam does not pass through the movable object when the movable object is moving relative to a separate non-movable object within the image, and wherein defining the seam is based, at least partially, on information of the points associated with the movable object.

16. The apparatus as claimed in claim 9, wherein the movable object comprises a non-living object.

17. A computer program product comprising at least one non-transitory computer-readable storage medium, the non-transitory computer-readable storage medium comprising a set of instructions, which, when executed by one or more processors, cause an apparatus at least to:
facilitate at least in part receiving of a first image and a second image;
facilitate receiving of location information of a movable object, wherein the movable object can change position between the first image and the second image;
track local movement of the movable object while the images are being captured and as the movable object is moving relative to a separate non-movable object within the image; and
generate a panorama image based at least on the first image, the second image, the movement, and the location information of the movable object.

18. The computer program product as claimed in claim 17, wherein the location information of the movable object comprises location information in overlapping regions of the first image and the second image.

19. The computer program product as claimed in claim 17, wherein, to facilitate receipt of the location information, the apparatus is further caused, at least in part, to by:
identify presence of the movable object in viewfinders of the first image and the second image; and
determine points associated with the movable object in overlapping regions of the first image and the second image.

20. The computer program product as claimed in claim 17, wherein the apparatus is further caused, at least in part to, store the location information.

21. The computer program product as claimed in claim 17, wherein, to generate the panorama image, the apparatus is further caused, at least in part to, determine an image registration matrix of the first image and the second image, wherein to determine the image registration matrix, points associated with the movable object are discarded.

22. The computer program product as claimed in claim 21, wherein the apparatus is further caused, at least in part to:
warp the first image and the second image based on the image registration matrix;
label a seam in the overlapping regions of warped images of the at least one of the first image and the second image based on the points associated with the movable object; and
blend the first image and the second image along the seam to generate the panorama image.

* * * * *